United States Patent
Andreev et al.

(10) Patent No.: US 7,529,714 B2
(45) Date of Patent: May 5, 2009

(54) COST MANAGEMENT OF SOFTWARE APPLICATION PORTFOLIO

(75) Inventors: Dmitrii Andreev, Port Chester, NY (US); Paul G. Greenstein, Croton-on-Hudson, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/011,681

(22) Filed: Dec. 14, 2004

(65) Prior Publication Data

US 2006/0143532 A1    Jun. 29, 2006

(51) Int. Cl.
G06Q 10/00  (2006.01)
G06Q 30/00  (2006.01)
G06F 17/00  (2006.01)
G06G 7/00   (2006.01)

(52) U.S. Cl. .......................................... 705/400; 705/1
(58) Field of Classification Search ................ 705/1, 705/400
See application file for complete search history.

(56) References Cited

U.S. PATENT DOCUMENTS

| | | | |
|---|---|---|---|
| 2002/0069102 A1* | 6/2002 | Vellante et al. | 705/10 |
| 2002/0178095 A1* | 11/2002 | Vellante et al. | 705/30 |
| 2002/0194052 A1 | 12/2002 | Delano et al. | |
| 2003/0144953 A1* | 7/2003 | Razum et al. | 705/40 |
| 2004/0004631 A1 | 1/2004 | Debique et al. | |
| 2004/0053602 A1 | 3/2004 | Wurzburg | |
| 2004/0199417 A1* | 10/2004 | Baxter et al. | 705/10 |
| 2004/0225583 A1* | 11/2004 | Joodi | 705/35 |
| 2004/0230464 A1* | 11/2004 | Bliss et al. | 705/7 |
| 2004/0230506 A1* | 11/2004 | Casco-Arias et al. | 705/35 |
| 2005/0033629 A1* | 2/2005 | Forman et al. | 705/10 |
| 2005/0071286 A1* | 3/2005 | Laicher et al. | 705/400 |

OTHER PUBLICATIONS

"Organization of Information Technology Functions", Apr. 12, 2001, WIPO.*

"SpiritSoft: SpiritSoft offers free SpiritWave Integration Kit for TIBCO Rendezvous; Reduces the total cost of ownership and extends the functionality of proprietary messaging networks", M2 Presswire, Sep. 18, 2001, p. 1.*

(Continued)

*Primary Examiner*—John W Hayes
*Assistant Examiner*—Fadey S Jabr
(74) *Attorney, Agent, or Firm*—Schmeiser & Olson & Watts; William E. Schiesser

(57) ABSTRACT

A method for managing a cost of ownership of a portfolio of N software applications ($N \geq 2$). A regression function is identified for each application. Each regression function expresses an approximate cost of ownership of the applications in terms of parameters and coefficients. J applications $A_1, A_2, \ldots, A_J$ are selected from the N applications such that a remaining N−J applications are unselected (J<N). The coefficients for the N−J unselected applications constitute a subset of the coefficients for the J selected applications. $F_j$ represents the approximate cost of ownership of the application $A_j$ for $j=1, 2, \ldots, J$. An actual cost of ownership $G_j$ of application $A_j$ for $j=1, 2, \ldots, J$ is provided. The coefficients for the J selected applications are determined so as to minimize a function $H = \Sigma_j W_j |F_j - G_j|^P$ ($P > 0$). $\Sigma_j$ represents a summation over j from $j=1$ to $j=J$. $W_j$ are predetermined weights.

16 Claims, 7 Drawing Sheets

OTHER PUBLICATIONS

"Sun Microsystems: Sun Microsystems delivers new CIM-compliant SAN management software; Continues to lead industry on storage open standards; Complete storage management portfolio enables customers to improve service levels and reduce total cost of ownership", M2 Presswire, Aug. 20, 2002, p. 1.*

Hoffman, Thomas, "TCO Flawed But Useful", Computerworld, vol. 36, No. 49, Dec. 2, 2002, pp. 52.*

Yo Funaki, Virtual Test Function for Control Application, Technical Papers of ISA, Oct. 5-7, 1999, vol. 389, pp. 61-69.

Suda, T., Outsourcing Market Trends and Related Fujitsu Activities, Sep. 2003, vol. 54, Issue 5, pp. 360-365.

Mathematical Handbook for Scientists and Engineers, Korn et al., Dover Publications, Inc., 8 pages.

Guided Simulated Annealing Method for Optimization Problems, Chou et al., Physical Review E 67, 066704 (2003), pp. 066704-1-066704-6.

Introduction to Probability and Statistics for Engineers and Scientists, Sheldon M. Ross, Dept. of Industrial Engineering and Operations Research University of California, Berkeley, Elsevier Academic Press, pp. 353-354 with Cover page.

Boehm et al., Software Economics: A Roadmap, pp. 319-343.

Albert E. Edlund, How Thin Clients Lead to Fat Networks, Business Communications Review, Jul. 1998, pp. 28-31.

* cited by examiner

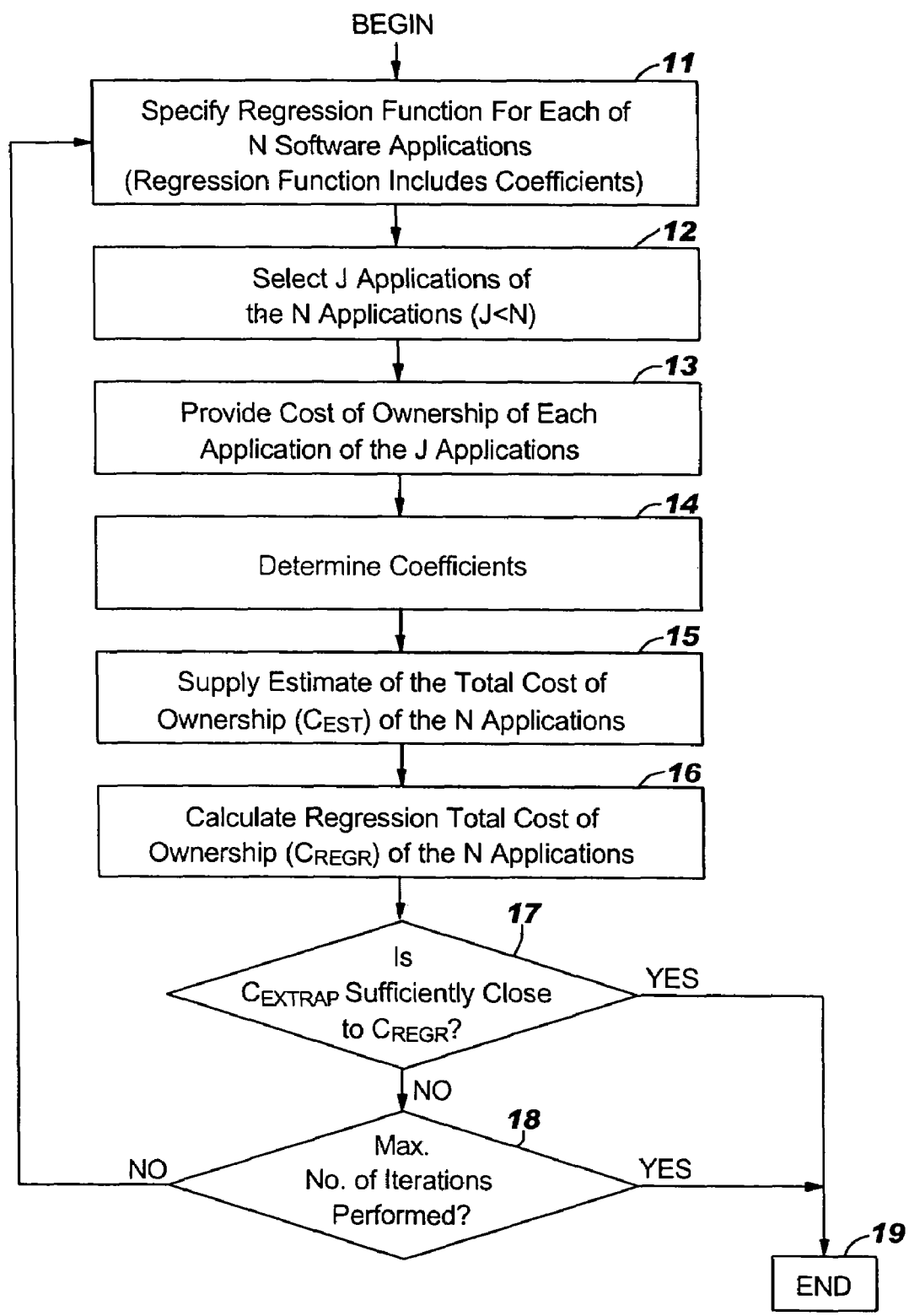

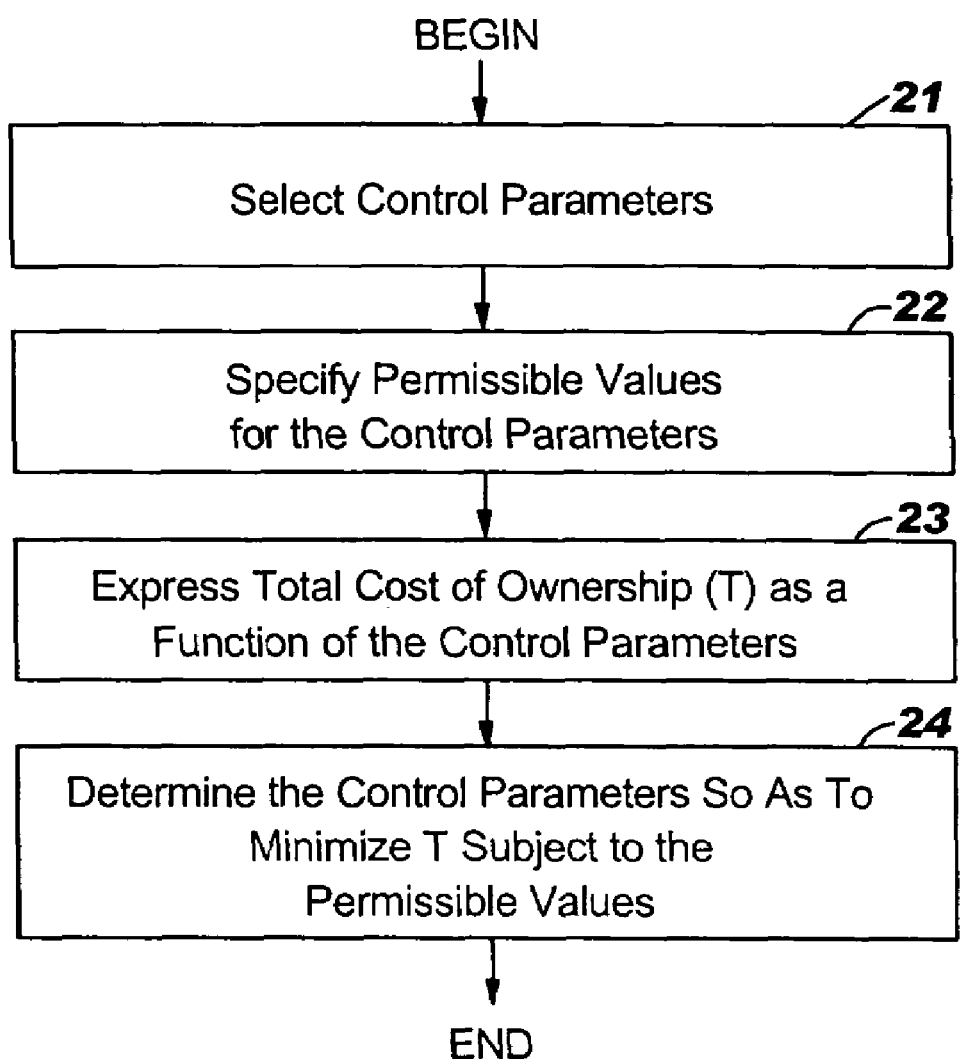

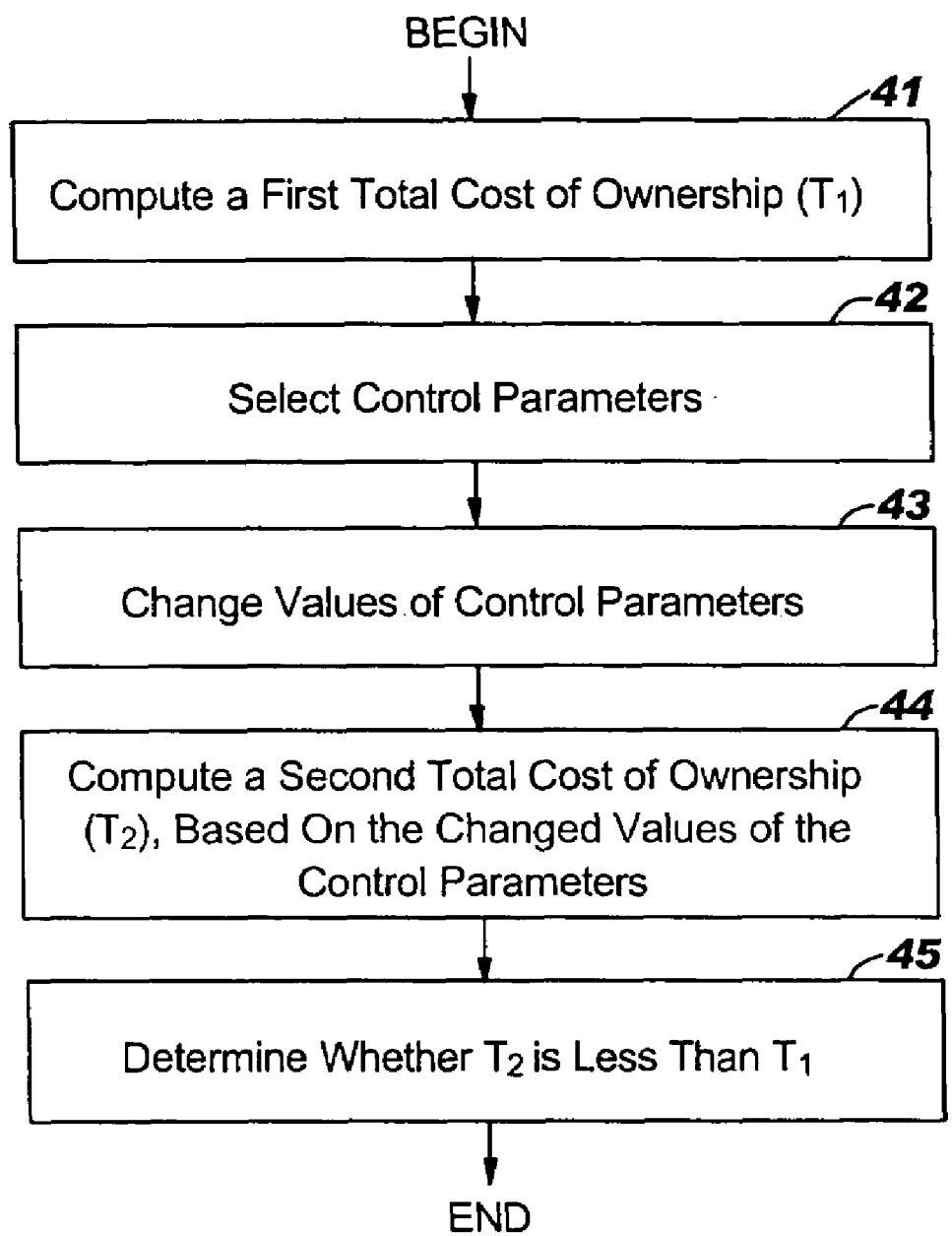

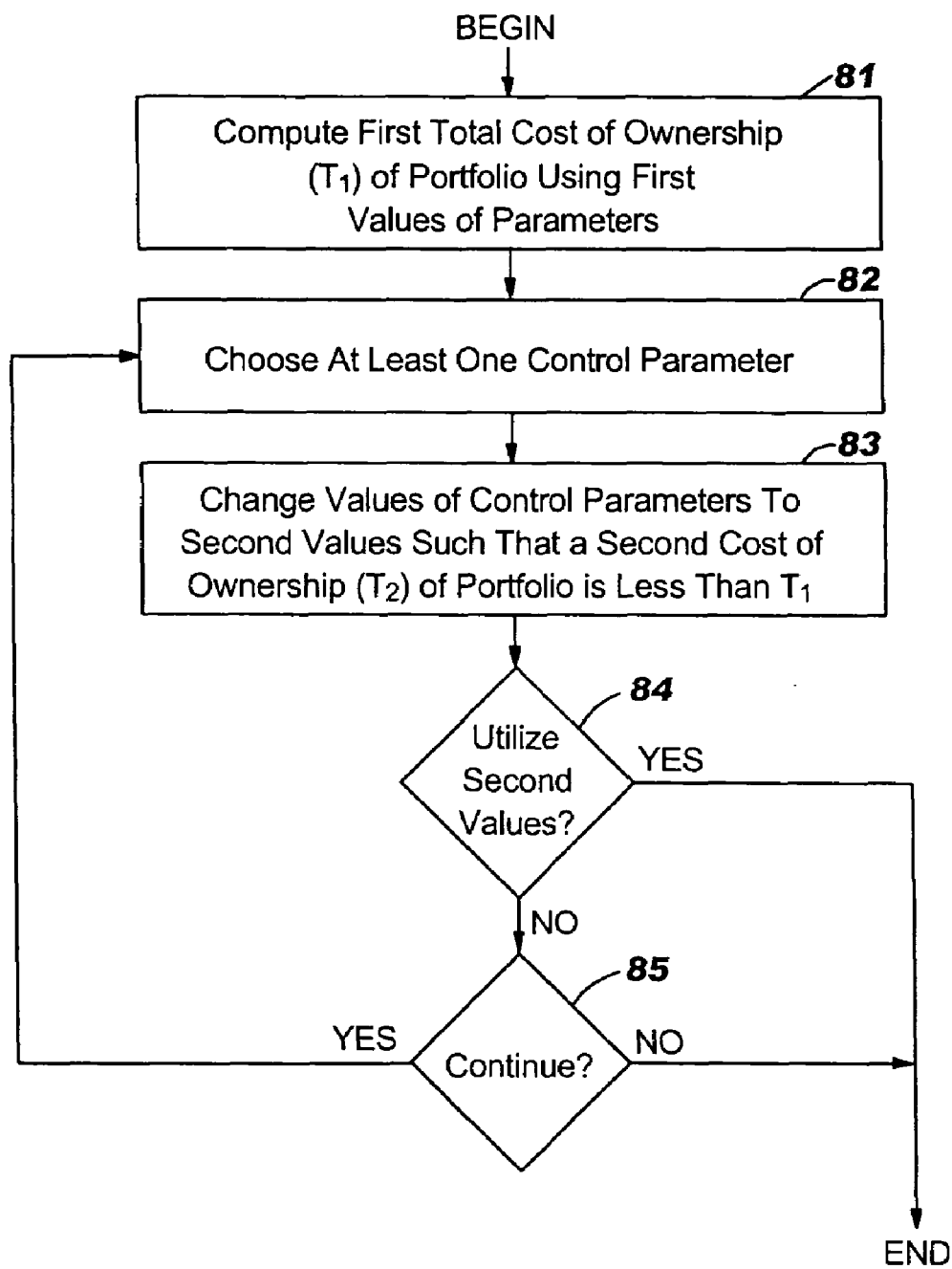

FIG. 5

| | | Applications 53 | | | |
|---|---|---|---|---|---|
| | | 52 | | 54 | 55 |
| 61 → | Application | CRM | eMail | Procurement app | Payroll app |
| 62 → | Platform | Wintel/Unix | Unix | Wintel/Unix | Mainframe |
| 63 → | Technology | Java | C | Java | PL/1 |
| 64 → | No. of users registered/ concurrent | 5000/500 | 5000/500 | 500/100 | 100/20 |
| 65 → | Availability | 24x7 (168) | 24x7 (168) | 6am-9pm x 7 (21) | 6am-9pm x 7 (21) |
| 66 → | Total size of app executable files | 5GB | 0.5GB | 5GB | 0.5GB |
| 67 → | Total size app data | 36GB | 500GB | 36GB | 36GB |
| 68 → | Type of the client app | Browser | POP3/IMAP client | Browser | Client app |
| 69 → | Internet bandwidth usage, per transaction | 50 KB | Up to 200MB | 50KB | 5KB |
| 70 → | Transactions/user/day | 100 | 50 | 200 | 50 |
| 71 → | Servers | S1 - S10 | S15-S16 | S9-14 | S17-S18 |
| 72 → | Regression Function, $F_j$ | (k1* No. of concurrent users + k2*Transactions + K3*appDataSize + k4* appExeSize) * availability | (k5* No. of concurrent users + k6* Transactions + k7 * appDataSize + k8* appExeSize) * availability | (k1* No. of concurrent users + k2* Transactions + k3* appDataSize + k4* appExeSize) * availability | (k9* No. of concurrent users + k10* Transactions + k11* appDataSize + k12* appExeSize) * availability |
| 73 → | TCO direct, Thousand dollars (OTC + 36 * MRC for all servers); $G_j$ | 546 | 276 | 322 | 644 |
| 74 → | Coefficients | k1=0.4 k2=0.5 k3=0.6 k4=0.7 | k5=0.15 k6=0.15 k7=0.1 k8=1.0 | k1=0.4 k2=0.5 k3=0.6 k4=0.7 | k9=8.0 k10=8.0 k11=2.4 k12=2.0 |
| 75 → | $F_j$, Thousand Dollars | 550.2 | 266 | 330.2 | 647.4 |

FIG. 6
Servers

| | Platform | CPU | RAM | Disk | One time charge (OTC), Thousand Dollars | Monthly recurring charge (MRC), Thousand Dollars |
|---|---|---|---|---|---|---|
| Server 1 | Wintel | 4 x 2.8GHz | 16GB | 4 x 18GB | 10 | 1 |
| Server 2 | Wintel | 4 x 2.8GHz | 16GB | 4 x 18GB | 10 | 1 |
| Server 3 | Wintel | 4 x 2.8GHz | 16GB | 4 x 18GB | 10 | 1 |
| Server 4 | Wintel | 4 x 2.8GHz | 16GB | 4 x 18GB | 10 | 1 |
| Server 5 | Wintel | 8x2.4GHz | 32GB | 4 x 18GB | 20 | 1 |
| Server 6 | Wintel | 8x2.4GHz | 32GB | 4 x 18GB | 20 | 1 |
| Server 7 | Wintel | 8x2.4GHz | 32GB | 4 x 18GB | 20 | 1 |
| Server 8 | Wintel | 8x2.4GHz | 32GB | 4 x 18GB | 20 | 1 |
| Server 9 | Unix | 4x800Mhz | 32GB | SAN | 30 | 3 |
| Server 10 | Unix | 4x800Mhz | 32GB | SAN | 30 | 3 |
| Server 11 | Wintel | 4 x 2.8GHz | 16GB | 4 x 18GB | 10 | 1 |
| Server 12 | Wintel | 4 x 2.8GHz | 16GB | 4 x 18GB | 10 | 1 |
| Server 13 | Wintel | 4 x 2.8GHz | 16GB | 4 x 18GB | 10 | 1 |
| Server 14 | Wintel | 4 x 2.8GHz | 16GB | 4 x 18GB | 10 | 1 |
| Server 15 | Unix | 4x800Mhz | 16GB | SAN | 30 | 3 |
| Server 16 | Unix | 4x800Mhz | 16GB | SAN | 30 | 3 |
| Server 17 | Mainframe | | 16GB | 4 x 18GB | 70 | 7 |
| Server 18 | Mainframe | | 16GB | 4 x 18GB | 70 | 7 |

US 7,529,714 B2

COST MANAGEMENT OF SOFTWARE APPLICATION PORTFOLIO

BACKGROUND OF THE INVENTION

1. Technical Field

The present invention relates to cost management of a software application portfolio.

2. Related Art

Known methods of software application portfolio cost management for large software application portfolios have inadequate accuracy and/or are incapable of effectively dealing with complexities associated with large application portfolios. Thus, there is a need for software application portfolio cost management with sufficient accuracy and capable of effectively dealing with complexities associated with large application portfolios.

SUMMARY OF THE INVENTION

The present invention provides a method for managing a cost of ownership of a portfolio of N software applications, said method comprising the steps of:

identifying a regression function for each software application of the N software applications, wherein each regression function expresses an approximate cost of ownership of the application in terms of at least one parameter and at least one undetermined coefficient, wherein N is at least 2;

selecting J applications $A_1, A_2, \ldots, A_J$ from the N applications such that a remaining N−J applications of the N applications are unselected, wherein J<N, wherein the coefficients in the regression functions for the N−J unselected applications constitute a subset of the coefficients in the regression functions for the J selected applications, and wherein $F_j$ represents the approximate cost of ownership of the application $A_j$ for $j=1, 2, \ldots, J$; and determining the coefficients in the regression functions for the J selected applications so as to minimize a function $H = \Sigma_j W_j |F_j - G_j|^P$, wherein $G_j$ is an actual cost of ownership of application $A_j$ for $j=1, 2, \ldots, J$, wherein $\Sigma_j$ represents a summation over j from j=1 to j=J, wherein P>0, and wherein $W_j$ are predetermined weights subject to $W_j > 0$.

The present invention provides a computer program product, comprising a computer usable medium having a computer readable program code embodied therein, said computer readable program code comprising an algorithm adapted to implement a method for managing a cost of ownership of a portfolio of N software applications, said method comprising the steps of:

identifying a regression function for each software application of the N software applications, wherein each regression function expresses an approximate cost of ownership of the application in terms of at least one parameter and at least one undetermined coefficient, wherein N is at least 2;

selecting J applications $A_1, A_2, \ldots, A_J$ from the N applications such that a remaining N−J applications of the N applications are unselected, wherein J<N, wherein the coefficients in the regression functions for the N−J unselected applications constitute a subset of the coefficients in the regression functions for the J selected applications, and wherein $F_j$ represents the approximate cost of ownership of the application $A_j$ for $j=1, 2, \ldots, J$; and determining the coefficients in the regression functions for the J selected applications so as to minimize a function $H = \Sigma_j W_j |F_j - G_j|^P$, wherein $G_j$ is an actual cost of ownership of application $A_j$ for $j=1, 2, \ldots, J$, wherein $\Sigma_j$ represents a summation over j from j=1 to j=J, wherein P>0, and wherein $W_j$ are predetermined weights subject to $W_j > 0$.

The present invention provides a computer system comprising a processor and a computer readable memory unit coupled to the processor, said memory unit containing instructions that when executed by the processor implement a method for managing a cost of ownership of a portfolio of N software applications, said method comprising the computer implemented steps of:

identifying a regression function for each software application of the N software applications, wherein each regression function expresses an approximate cost of ownership of the application in terms of at least one parameter and at least one undetermined coefficient, wherein N is at least 2;

selecting J applications $A_1, A_2, \ldots, A_J$ from the N applications such that a remaining N−J applications of the N applications are unselected, wherein J<N, wherein the coefficients in the regression functions for the N−J unselected applications constitute a subset of the coefficients in the regression functions for the J selected applications, and wherein $F_j$ represents the approximate cost of ownership of the application $A_j$ for $j=1, 2, \ldots, J$; and determining the coefficients in the regression functions for the J selected applications so as to minimize a function $H = \Sigma_j W_j |F_j - G_j|^P$, wherein $G_j$ is an actual cost of ownership of application $A_j$ for $j=1, 2, \ldots J$, wherein $\Sigma_j$ represents a summation over j from j=1 to j=J, wherein P>0, and wherein $W_j$ are predetermined weights subject to $W_j > 0$.

The present invention provides a method for managing, by a service provider, a cost of ownership of a portfolio of N software applications of a customer, said method comprising the steps of:

identifying a regression function for each software application of the N software applications, wherein each regression function expresses an approximate cost of ownership of the application in terms of at least one parameter and at least one undetermined coefficient, wherein N is at least 2;

selecting J applications $A_1, A_2, \ldots, A$, from the N applications such that a remaining N−J applications of the N applications are unselected, wherein J<N, wherein the-coefficients in the regression functions for the N−J unselected applications constitute a subset of the coefficients in the regression functions for the J selected applications, and wherein $F_j$ represents the approximate cost of ownership of the application $A_j$ for $j=1, 2, \ldots, J$; and determining the coefficients in the regression functions for the J selected applications so as to minimize a function $H = \Sigma_j W_j |F_j - G_j|^P$, wherein $G_j$ is an actual cost of ownership by the customer of application $A_j$ for $j=1, 2, \ldots, J$, wherein $\Sigma_j$ represents a summation over j from j=1 to j=J, wherein P>0, wherein $W_j$ are predetermined weights subject to $W_j > 0$, and wherein the identifying, selecting, and performing steps are performed by the service provider.

The present invention advantageously provides software application portfolio cost management with sufficient accuracy and capable of effectively dealing with complexities associated with large application portfolios.

BRIEF DESCRIPTION OF THE DRAWINGS

FIG. 1 is a flow chart for determining coefficients in regression functions used for estimating the cost of ownership of a software application portfolio, in accordance with embodiments of the present invention.

FIG. 2 is a flow chart for determining values of control parameters to reduce the total cost of ownership of the software application portfolio modeled by the regression functions of FIG. 1, in accordance with embodiments of the present invention.

FIG. 3 is a flow chart for determining whether changes in values of control parameters reduce the total cost of ownership of the software application portfolio modeled by the regression functions of FIG. 1, in accordance with embodiments of the present invention.

FIG. 4 is a flow chart for iteratively converging on control parameters and their values to reduce the total cost of ownership of the software application portfolio modeled by the regression functions of FIG. 1, in accordance with embodiments of the present invention.

FIGS. 5-6 are tables depicting an example of applications, associated parameters, regression functions, and coefficients for modeling the cost of ownership of software applications, in accordance with embodiments of the present invention.

DETAILED DESCRIPTION OF THE INVENTION

Figure 7:
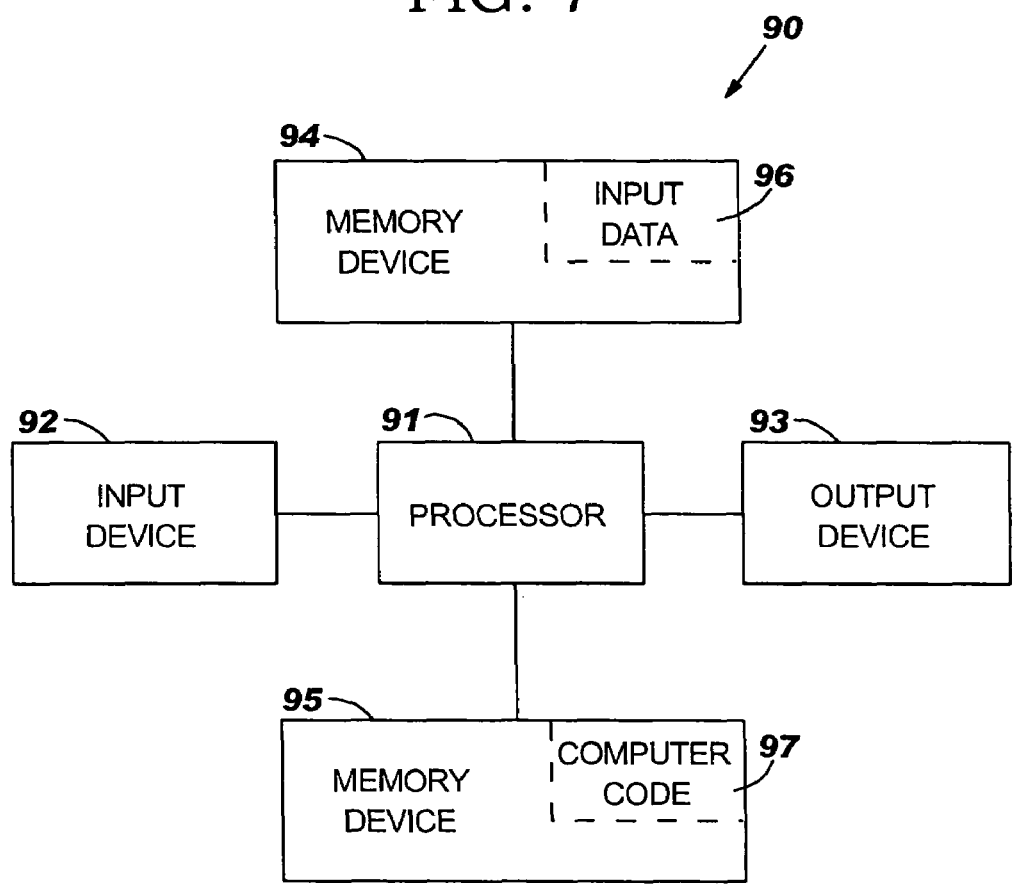
FIG. 7 illustrates a computer system used for managing the cost of ownership of a software application portfolio, in accordance with embodiments of the present invention.

FIG. 1 is a flow chart comprising steps 11-19 for determining coefficients in regression functions used for estimating the cost of ownership of a portfolio of N software applications (hereinafter, "applications"), in accordance with embodiments of the present invention. The coefficients may be determined by a service provider for a customer. Generally, N is at least 2. Various embodiments, however, relate to a large portfolio characterized by N being much larger (e.g., N>500, N>1000, N>5000, etc.). Calculating the cost of ownership of the application portfolio comprises calculating the cost of ownership of each application in the portfolio. The cost of ownership of an application includes the cost of maintaining the application and the cost of utilizing and maintaining all instances of the application.

A rigorous (i.e., actual) calculation of the cost of ownership of each application may be difficult, tedious, and time-consuming. Accordingly, the present invention develops a mathematical model, according to methodology described in FIG. 1, to determine the cost of ownership of the portfolio, based on information derived from J applications of the N applications, where J<N. Generally, J does not exceed a fraction of N, wherein the fraction may be, inter alia, 0.05, 0.10, 0.15, 0.20, 0.25., 0.30, 0.35, 0.40, 0.45, 0.50., 0.55, 0.60, etc. Thus, the model developed by the present invention has an advantage of requiring a rigorous calculation for only J applications instead of for the entire N applications. In addition, the developed model can be used advantageously to reduce the total cost of ownership of the portfolio (TCO), as will be described infra in conjunction with FIGS. 2-4.

In FIG. 1, step 11 specifies a regression function for each software application of the N software applications. Step 11 may be performed by, inter alia, the service provider. Each regression function expresses an approximate cost of ownership of the application in terms of at least one parameter and at least one undetermined coefficient. As stated supra, N is at least 2. The regression function $F_n$ for application n (n=1, 2, ..., N) is a function of known parameters ($P_1, P_2, \ldots$) and undetermined coefficients ($K_1, K_2, \ldots$). Formally, $$F_n = F_n(P_1, P_2, \ldots, K_1, K_2, \ldots) \tag{1}$$

In equation (1), the parameters ($P_1, P_2 \ldots$), the number of such parameters, the coefficients ($K_1, K_2, \ldots$), and the number of such coefficients are each application dependent (i.e., dependent on the application index n). Some applications may comprise the same coefficients and/or parameters (but not necessarily the same values of the parameters). The parameters may comprise, inter alia, application size, application complexity (e.g., as characterized by a numerical weight), instance footprint (e.g., number of servers required), instance topology complexity (e.g., topological complexity of the network connecting the servers comprising the instance footprint), implementation technology (e.g., operating system, computer language, etc.), etc. The tables of FIGS. 5-6, described infra, provides examples of parameters. The coefficients are constants of the model which are determined by the methodology of the present invention as will be described infra.

In a first approach to determining the parameters $P_1$, $P_2$, ... for each application of the N applications, the parameters $P_1, P_2, \ldots$ may be determined for each application independently. In a second approach to determining the parameters $P_1, P_2, \ldots$ for each application of the N applications, the portfolio is divided into groups of similarly modeled applications (with at least one group comprising at least 2 applications) such that the applications in each group having at least two applications are modeled in the same manner mathematically using the same parameters and functional dependencies, but differing at most in the respective coefficients $K_1, K_2, \ldots$. For either the first approach or the second approach, the parameters $P_1, P_2, \ldots$ may be determined directly (e.g., using prior knowledge of the effect of the parameters of the cost of each application in the first approach or of the similarly modeled applications in the second approach). Alternatively, for either the first approach or the second approach, the parameters $P_1, P_2, \ldots$ may be selected from a larger set of candidate parameters using a technique such as, inter alia, correlation analysis for selecting those parameters that are most strongly correlated with the cost of each application in the first approach or of the similarly modeled applications in the second approach.

Each regression function $F_n$ has its own set of parameters and coefficients, and the modeling methodology of the present invention determines the coefficients for each regression function $F_n$. However, different regression functions $F_n$ (i.e., for different values of n) may utilize common parameters and/or coefficients, as illustrated by the following example in Equations (2)-(7) for $F_1, F_2, F_3, F_4, F_5$, and $F_6$ which utilize parameters $P_1, \ldots P_5$ and coefficients $K_1, \ldots, K_{10}$.

$$F_1 = K_1 * P_1 + K_2 * P_2 + K_3 * P_3 \tag{2}$$

$$F_2 = K_4 * P_1 + K_5 * P_2 + K_6 * P_3 \tag{3}$$

$$F_3 = K_7 * \exp(K_8 * P_4) \tag{4}$$

$$F_4 = K_9 * P_5 + K_{10} \tag{5}$$

$$F_5 = K_4 * P_1 + K_5 * P_2 + K_6 * P_3 \tag{6}$$

$$F_6 = K_7 * \exp(K_8 * P_4) \tag{7}$$

Step 12 selects J applications $A_1, A_2, \ldots, A_j$ from the N applications such that a remaining N−J applications of the N applications are unselected, wherein J<N. $F_j$ represents the approximate cost of ownership of the application $A_j$ for j=1, 2, ..., J, as modeled by the present invention. Step 12 may be performed by, inter alia, the service provider. The J applications are selected such that the regression functions of the J selected applications are representative of the regression functions of the N applications. The coefficients in the regression functions for the N−J unselected applications constitute a subset of the coefficients in the regression functions for the J selected applications. This latter requirement is very important as explained in the following example.

For example, consider the case of Equations (2)-(7) with N=6, J=4 and N−J=2, wherein the J selected applications $A_1$, $A_2$, $A_3$, and $A_4$ have associated regression functions $F_1$, $F_2$, $F_3$, and $F_4$, and wherein the N−J unselected applications $A_5$ and $A_6$ have associated regression functions $F_5$ and $F_6$. Note that the coefficients ($K_4$, $K_5$, $K_6$, $K_7$, $K_8$) in the regression functions $F_5$ and $F_6$ for the unselected applications $A_5$ and $A_6$ are a subset of the coefficients ($K_1$, ..., $K_{10}$) for the J selected applications $A_1$, $A_2$, $A_3$, and $A_4$. The preceding requirement reflects the fact that the only coefficients determined by the methodology of the present invention are the coefficients appearing in the regression functions for the J selected applications. Yet, the regression functions of all N applications are to be subsequently summed to determine a total cost of ownership (TCO) of the portfolio. Thus, the regression functions of the N−J unselected applications will need to be calculated. This requires that all coefficients appearing in the regression functions of the N−J unselected applications must be known, which is the reason why the coefficients in the regression functions for the N−J unselected applications constitute a subset of the coefficients in the regression functions for the J selected applications.

Step 13 provides an actual cost of ownership $G_j$ of selected application $A_j$ for j=1, 2, ..., J. Step 13 may be performed by, inter alia, the customer; i.e., the customer may determine $G_j$ and inform the service provider of the value of $G_j$. $G_j$ may be computed, inter alia, as a sum of costs of the components of the application, said components including hardware, software, and labor (i.e., operations and support). In one embodiment, the cost of ownership (TCO) of a component may be calculated according to TCO=OTC+C*MRC, wherein OTC is a one-time charge, MRC is a monthly recurring charge, and C is a constant reflecting the application lifetime expressed in months (e.g. C=36 months). In a shared infrastructure environment, a cost of the infrastructure elements may be divided amongst all the applications using the particular element, proportionally to some characteristic metrics. For example, a firewall usage cost may be divided amongst the applications protected by the firewall proportionally to the application traffic through the firewall. Similarly, if several applications are co-located on a single hardware server, or on a group of hardware servers, or if several applications use a single hardware server or a group of hardware servers, the usage cost may be divided amongst those applications proportionally to some characteristic metrics; e.g. central processor unit (CPU) usage by the processes pertaining to an application. The method of the present invention determines the coefficients in the J selected applications in such a manner as to match $F_j$ to $G_j$ as closely as possible in accordance with step 14.

Step 14 determines the coefficients in the regression functions for the J selected applications so as to minimize a function H, wherein $$H = \Sigma_j W_j |F_j - G_j|^P \tag{8}$$

wherein $\Sigma_j$ represents a summation over j from j=1 to j=J. The use of the absolute value of $F_j - G_j$ in Equation (8) guarantees that H cannot be negative. Step 14 may be performed by, inter alia, the service provider.

In Equation (8), $W_j$ are predetermined weights subject to $W_j > 0$ for j=1, 2, ..., J. The weights $W_j$ permit differentiation in the relative importance of the J selected applications. For example, there may be a budget-related reason or a management policy reason why a particular selected application should receive a higher weight than other selected applications. In some embodiments, however, the weights are application independent, so that $W_j$ is set to a constant weight W for j=1, 2, ..., J. The weights $W_j$ may be predetermined by, inter alia, the service provider or the customer.

In Equation (8), P is a positive real number (i.e., P>0). For example, if P=2 then H is proportional to the mean squared difference between $F_j$ and $G_j$. However, any other value of P (e.g., P=1, P=1.5, P=3, etc.) may be used subject to P>0.

The coefficients in the J regression functions of the J selected applications are determined via minimization of H. In the example of Equations (2)-(7) with N=6 and J=4, discussed supra, the ten coefficients of $K_1$, ..., $K_{10}$ appearing in the regression functions $F_1$, $F_2$, $F_3$, and $F_4$ will be determined via minimization of H. If a numerical value of each parameter in each regression function is supplied, then the minimization of H will result in numerically computed values for the coefficients. However, if the parameters in the regression functions are left in symbolic, non-numerical form, then the minimization of H will result in an analytical solution in which the coefficients are expressed in terms of the parameters.

The function H in Equation (8) may be minimized by any method known to a person of ordinary skill in the art. For example, the function H may be minimized by solving simultaneous equations $$\partial H / \partial \underline{K} = 0 \tag{9}$$

wherein $\underline{K}$ is a vector consisting of the unique coefficients in the regression functions of the J selected applications; i.e., $\underline{K} = [K_1, K_2, ...]$. For the case of the ten unique coefficients $K_1, ..., K_{10}$, Equation (9) stands for the following set of equations: $\partial H/\partial K_1 = 0$, $\partial H/\partial K_2 = 0$, ..., $\partial H/\partial K_{10} = 0$ such that $\underline{K} = [K_1, K_2, ..., K_{10}]$. Thus, $\underline{K}$ is determined by solving Equations (9).

For other mathematical and numerical methods of determining values for coefficients that minimize H and/or for performing statistical regression, see Ross, Sheldon M., Introduction To Probability and Statistics, third edition, pages 353-354 and 391 (2004), Elsevier Academic Press; and Korn, G. A and T. M. Korn, "Mathematical Handbook For Scientists and Engineers, pages 605-606, 611, and 698, Dover Publications (2000).

Steps 15-17 are directed to determining whether the coefficients determined in step 14 are sufficiently accurate for the purpose of determining a cost of ownership of the portfolio of N applications.

Step 15 supplies an estimate of a total cost of ownership $C_{EST}$ of the N applications. This estimate does not have to be rigorously exact, but rather is an estimated amount such as might appear in a quarterly or annual financial report. Step 15 may be performed by, inter alia, the service customer who may inform the servive provider of the value of $C_{EST}$.

Step 16 calculates a regression total cost of ownership $C_{REGR}$ of the N applications. The calculation of $C_{REGR}$ comprises summing the N regression functions; i.e., $$C_{REGR} = \Sigma_n F_n(P_1, P_2, ..., K_1, K_2, ...) \tag{10}$$

wherein $\Sigma_n$ represents a summation over n from n=1 to n=N. Equation (10) utilizes the computed coefficients ($K_1$, $K_2$, ...) and a numerical value of each parameter ($P_1$, $P_2$, ...) relating to the N applications. Step 16 may be performed by, inter alia, the service provider.

Step 17 ascertains whether $C_{REGR}$ differs from $C_{EST}$ by more than a tolerance. The tolerance may be a pre-determined cost differential or a predetermined percent. If $C_{REGR}$ differs by no than the tolerance, then the method of FIG. 1 ends at step 19. If $C_{REGR}$ differs from $C_{EST}$ by more than the tolerance, then step 18 is next executed. Step 17 may be performed by, inter alia, the service provider.

Step 18 ascertains whether a specified maximum number of iterations has been performed. Step 18 may be performed by, inter alia, the service provider. If the maximum number of iterations has been performed, then the method of FIG. 1 ends. If the maximum number of iterations has not been performed, then the method loops back to step 11 and steps 11-18 are performed iteratively until the method ends at step 19 when $C_{REGR}$ differs from $C_{EST}$ by no than the tolerance or when the maximum number of iterations has been performed. Each iteration, comprising steps 11-18, need execute only those steps representing a change from the previous iteration. For example, step 15 may yield a constant value of $C_{EST}$ and therefore may need to be executed only once. As another example, the J applications in a current iteration may be the same applications that were processed during the immediately previous iteration and therefore steps 12-13 would not have to be executed in the current iteration.

Achieving the condition of $C_{REGR}$ not differing from $C_{EST}$ by more than the tolerance indicates that the coefficients calculated in step 14 may be used to calculate the total cost of ownership of the portfolio ($C_{REGR}$) via Equation (10) with sufficient accuracy. Thus, a model for calculating the total cost of ownership of the portfolio has been developed. FIGS. 2-4 illustrate how this model may be used to reduce the total cost of ownership of the portfolio to a value that is less than $C_{REGR}$.

FIG. 2 is a flow chart comprising steps 21-24 for determining values of control parameters to reduce the total cost of ownership of the software application portfolio, modeled by the regression functions of FIG. 1, to a value below $C_{REGR}$, in accordance with embodiments of the present invention. The method of FIG. 2 assumes that the model with computed coefficients has been developed in accordance with the method of FIG. 1. Steps 21-24 may be performed by, inter alia, the service provider.

Step 21 of FIG. 2 begins following the ending of the method of FIG. 1 at step 19. Step 21 of FIG. 2 selects at least one control parameter from the parameters in the N regression functions such that the remaining parameters in the N regression functions are unselected. Any parameter, of the parameters in the N regression functions, whose value may be varied may be selected to be a control parameter. Thus, the control parameters may be application dependent. The idea behind selecting control parameters is to determine values of the control parameters so as to reduce the total cost of ownership of the portfolio as will be described infra in conjunction with step 24.

Step 22 specifies permissible values for each control parameter of the at least one control parameter. The permissible values for each control parameter may independently be: a discrete set of values, at least one continuous range of values, or a combination thereof.

Step 23 expresses a total cost of ownership (T) of the N applications as a sum of the N regression functions associated with the N applications such that T is a function of the at least one control parameter. Denoting the at least one control parameter as $U_1, U_2, \ldots$, T has the following form:

$$T = \Sigma_n F_n(R_1, R_2, \ldots, K_1, K_2, \ldots, U_1, U_2, \ldots) \quad (11)$$

Note that $P_1, P_2, \ldots$ constitute the complete set of parameters in the regression functions of the N applications. Accordingly, $U_1, U_2, \ldots$ are the control parameters selected from $P_1, P_2, \ldots$, and $R_1, R_2, \ldots$ are the remaining parameters in the regression functions of the N applications that were not selected as control parameters. In Equation (11): numerical values are substituted for $R_1, R_2, \ldots$ in the regression functions of the N applications; and the values of the coefficients computed in accordance with FIG. 1 are substituted for $K_1, K_2, \ldots$ As a result, T is formally a function of the control parameters $U_1, U_2, \ldots$ Step 24 determines a value for each control parameter $U_1, U_2, \ldots$ so as to minimize T subject to the permissible values provided in step 22. Thus, T in Equation (11) is minimized with respect to $U_1, U_2, \ldots$, wherein $U_1, U_2, \ldots$ are constrained to fall within the permissible values of step 22.

Alternative methods may be employed to implement step 24 for determining the control parameters $U_1, U_2 \ldots$ For example, if $U_1, U_2 \ldots$ are each prescribed as a discrete set of values, then, the specific combination of $U_1, U_2, \ldots$ that minimizes T may be determined by brute force; i.e., by calculating T for each possible combination of $U_1, U_2 \ldots$ A more efficient method of determining $U_1, U_2 \ldots$ that minimizes T may be found in Chou, C. I. et al., "Guided Simulated Annealing Method For Optimization Problems", Physical Review E, 67, 066704-1 to 066704-6 (2003).

Yet another more efficient method of determining $U_1, U_2 \ldots$ that minimizes T is the heuristic optimization method for discrete functions as described in Rykov A. S., "Poiskovaja optimizatsija. Metody deformiruemyh konfiguratsij. (Heuristic optimization. Methods of deformable shapes)", pp. 77-81 (Moscow, Science Publishers, 1993).

Generally, any method known to a person of ordinary skill in the art may be used to determine $U_1, U_2, \ldots$ that minimizes T. As a result of performing steps 21-24 of FIG. 2, the total cost of ownership (T) of the portfolio of N applications has been reduced to a value that is less than $C_{REGR}$ of Equation (10). The resulting control parameters and their values computed in step 24 of FIG. 2 such that the total cost of ownership of the portfolio is reduced, and any other pertinent data, may be outputted.

FIG. 3 is a flow chart comprising steps 41-45 for determining whether changes in values of control parameters reduce the total cost of ownership of the software application portfolio, modeled by the regression functions of with FIG. 1, to a value below $C_{REGR}$, in accordance with embodiments of the present invention. Steps 41-45 may be performed by, inter alia, the service provider or the customer.

Step 41 of FIG. 3 begins following the ending of the method of FIG. 1 at step 19. Step 41 of FIG. 3 computes a first total cost of ownership ($T_1$) of the N applications as a first sum of the N regression functions associated with the N applications, using the computed coefficients and a first numerical value for each parameter in the N regression functions. $T_1$ is essentially the same as $C_{REGR}$ of Equation (10).

Step 42 selects at least one control parameter ($U_1, U_2, \ldots$) from the parameters ($P_1, P_2, \ldots$) in the N regression functions such that the remaining parameters ($R_1, R_2, \ldots$) in the N regression functions are unselected. Thus, the control parameters may be application dependent. Any parameter, of the parameters ($P_1, P_2, \ldots$) in the N regression functions, whose value may be varied, may be selected to be a control parameter. The idea behind selecting control parameters is to vary the values of the control parameters so as to reduce the total cost of ownership of the portfolio as will be described infra in conjunction with steps 43-45.

Step 43 changes the numerical value for the at least one control parameter ($U_1, U_2, \ldots$) from the first numerical value to a second numerical value.

Step 44 computes a second total cost of ownership ($T_2$) of the N applications via:

$$T_2 = \Sigma_n F_n(R_1, R_2, \ldots, K_1, K_2, \ldots, U_1, U_2, \ldots) \tag{13}$$

Equation (13) for $T_2$ is essentially the same equation as Equation (11) for T. In calculating $T_2$ from Equation (13): the coefficients $K_1, K_2 \ldots$ computed from the method of FIG. 1 are used; the first numerical values (see step 41) are used for $R_1, R_2, \ldots$; and the second numerical values (see step 43) are used for $U_1, U_2 \ldots$.

Step 45 determines whether $T_2$ is less than $T_1$. If $T_2$ is less than $T_1$, then the use of the second numerical values for $U_1$, $U_2$, . . . has been successful in reducing the total cost of ownership of the portfolio. If $T_2$ is not less than $T_1$, then the use of the second numerical values for $U_1, U_2, \ldots$ has not been successful in reducing the total cost of ownership of the portfolio and other second numerical values for $U_1, U_2, \ldots$ may be tried, or another set of control variables may be tried, in accordance with the method of FIG. 3.

Steps 42-45 may be flexibly utilized in any manner. For example, all control parameters $U_1, U_2, \ldots$ may be varied concurrently to calculate $T_2$ to determine whether $T_2$ is less than $T_1$. As another example, the control parameters $U_1$, $U_2, \ldots$ may be varied individually (i.e., one control parameter at a time) to determine whether a variation in each such control parameter, by itself, will reduce the total cost of ownership of the portfolio. As a third example, each control parameter individually, or a plurality of control parameters, may be varied to multiple second numerical values to determine which second numerical values effectuate the largest reduction in the total cost of ownership of the portfolio.

The resulting control parameters and their values determined via FIG. 3 such that the total cost of ownership of the portfolio is reduced, and any other pertinent data, may be outputted.

Some embodiments may utilize a hybrid method that combines the methods of FIGS. 2 and 3. For example, the method of FIG. 2 may be used for a first set of control parameters and the method of FIG. 3 may be used for a second set of control parameters.

FIG. 4 is a flow chart comprising steps 81-85 for iteratively converging on control parameters and their values to reduce the total cost of ownership of the software application portfolio modeled by the regression functions of FIG. 1, in accordance with embodiments of the present invention. Steps 81-85 may be performed by, inter alia, the service provider or the customer.

Step 81 of FIG. 4 begins following the ending of the method of FIG. 1 at step 19. Step 81 of FIG. 4 computes a first total cost of ownership ($T_1$) of the N applications as a first sum of the N regression functions associated with the N applications, using the computed coefficients and a first numerical value for each parameter in the N regression functions. $T_1$ is essentially the same as $C_{REGR}$ of Equation (10).

Step 82 chooses at least one control parameter ($U_1$, $U_2, \ldots$) from the parameters ($P_1, P_2, \ldots$) in the N regression functions. Thus, the control parameters may be application dependent. Any parameter, of the parameters ($P_1, P_2, \ldots$) in the N regression functions, whose value may be varied, may be chosen to be a control parameter. The idea behind choosing control parameters is to vary the values of the control parameters so as to reduce the total cost of ownership of the portfolio as will be described infra in conjunction with steps 83-85.

Step 83 changes the numerical value for each control parameter from the first numerical value to a second numerical value such that a second total cost of ownership ($T_2$) of the N applications is less than $T_1$. The second total cost of ownership $T_2$ is a second sum of the N regression functions associated with the N applications using the computed coefficients, the first numerical value for each unselected parameter, and the second numerical value for each chosen parameter.

In step 83, changing the numerical value for each control parameter from the first numerical value to a second numerical value may comprise constraining the second numerical value to be within specified permissible values for each control parameter in a manner analogous to step 22 of FIG. 2 as described supra. The permissible values for each control parameter may independently be selected from a discrete set of values, at least one continuous range of values, or a combination thereof.

In step 83, changing the numerical value for each control parameter from the first numerical value to a second numerical value may comprise minimizing $T_2$ with respect to the control parameters in a manner analogous to step 24 of FIG. 2 as described supra. The minimizing of $T_2$ may be in conjunction with said constraining the second numerical value to be within specified permissible values for each control parameter.

In step 83, changing the numerical value for each control parameter from the first numerical value to a second numerical value may be implemented in a manner analogous to step 43 of FIG. 3 as described supra.

Steps 84-85 collectively decide whether to continue or end the method of FIG. 4.

Step 84 decides whether to utilize the second numerical value for each control parameter as determined in step 83. Deciding whether to utilize the second numerical value for each control parameter may comprise deciding whether it is feasible to utilize the second numerical value for each control parameter. For example, if a control parameter is the number of concurrent users of a particular application and if the second numerical value of this control parameter (as determined by step 83) cannot be implemented in light of practical considerations, then it is not feasible to utilize the second numerical value for this particular control parameter.

If step 84 decides to utilize the second numerical value for each control parameter then the method ends with the second numerical value being used for each control parameter. If step 84 decides not to utilize the second numerical value for each control parameter then the method next executes step 85.

Step 85 determines whether to continue the method. Step 85 may determine to continue the method if, inter alia, there are other control parameter combinations and/or other numerical values for the control parameters to try. If step 85 determines not to continue the method, then the method ends without the second numerical value being utilized for each control parameter. If step 85 determines to continue the method, then the method executes a next iteration comprising re-execution of steps 82-85.

FIGS. 5-6 are tables depicting an example of applications, associated parameters, regression functions, and coefficients for modeling the cost of ownership of the applications by the methodology of FIG. 1, in accordance with embodiments of the present invention. FIG. 5 comprises columns 51-55 and rows 61-75. Columns 52-55 pertain respectively to the four selected applications (step 12 of FIG. 1) of: CRM (Customer Relationship Management), eMail, Procurement, and Payroll, as identified in row 61. The unselected applications are not listed in FIG. 5. Thus, J=4 and J<N for the example of FIG. 5.

Rows 61-71 in column 51 of FIG. 5 identify parameters characterizing the applications of this example, and rows 61-71 identify values of these parameters for the four selected applications of CRM, eMail, Procurement, and Payroll, respectively. Row 71 identifies the "server" parameter and FIG. 6 lists the Platform, CPU (Central Processing Unit) Capacity, RAM (Random Access Memory) Capacity, Disk Capacity, One Time Charge (OTC) and Monthly Recurring Charge (MRC) for each server appearing in row 71 of FIG. 5.

Row 72 of FIG. 5 identifies the regression function ($F_j$) for j=1, 2, 3, 4 for each selected application, wherein $k_1, k_2, \ldots,$ and $k_{12}$ are the coefficients in the regression functions $F_j$. The parameters in the regression functions are: number of concurrent users (row 64, second number following /), transactions (row 70), appDataSize (row 67), appExeSize (row 66), and availability (row 65). The parameters in rows 62-63 and 68-69 do not appear in the regression functions of row 72. Note that a parameter appearing in a regression function must have a numerical value in order to be utilized by the methodology of FIGS. 1-4. Therefore, for example, in order for the Platform parameter of row 62 to appear in a regression function, numerical values would have to be assigned to "Wintel/Unix", "Unix", and "Mainframe" for the applications in the portfolio.

Row 73 of FIG. 5 identifies the actual cost of ownership $G_j$ for each selected application.

Row 74 lists the values of the coefficients that minimize H of Equation (8) with $W_j=1$ for j=1, 2, 3, 4, through use of the methodology described supra in conjunction with FIG. 1. The values of $k_1, \ldots, k_{12}$ in row 74 satisfy a tolerance condition (see step 17 of FIG. 1).

Row 75 lists the values of $F_j$ (J=1, 2, 3, 4) resulting from substitution of the coefficient values in row 74 for $k_1, \ldots, k_{12}$ in $F_j$ of row 72.

FIG. 7 illustrates a computer system 90 used for managing the cost of ownership of a portfolio of software applications, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for managing a cost of ownership of a portfolio of software applications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for reducing a cost of ownership of a portfolio of N software applications, said method being performed via execution of computer implemented steps by a processor of a computer system, said method comprising performing the computer implemented steps, said computer implemented steps comprising:

identifying a regression function for each software application of the N software applications, wherein each regression function expresses an approximate cost of ownership of the application in terms of at least one parameter and at least one undetermined coefficient, wherein N is at least 2;

selecting J applications A1, A2, ..., Aj from the N applications such that a remaining N−J applications of the N applications are unselected, wherein J<N, wherein the coefficients in the regression functions for the N−J unselected applications constitute a subset of the coefficients in the regression functions for the J selected applications, and wherein Fj represents the approximate cost of ownership of the application Aj for j=1, 2, ..., J;

determining the coefficients in the regression functions for the J selected applications so as to minimize a function $H=\Sigma_j W_j |F_j-G_j|^P$, wherein $G_j$ is an actual cost of ownership of application $A_j$ for j=1, 2, ..., J, wherein $\Sigma_j$ represents a summation over j from j=1 to j=J, wherein P>0, and wherein $W_j$ are predetermined weights subject to $W_j$>0, wherein said determining the coefficients comprises computing said coefficients, said computing comprising utilizing a numerical value of each parameter in each regression function relating to the J applications;

calculating a regression total cost of ownership $C_{REGR}$ of the N applications, said calculating comprising summing the N regression functions associated with the N applications including utilizing the computed coefficients and a numerical value of each parameter relating to the N applications;

ascertaining whether $C_{REGR}$ differs from $C_{EST}$ by more than a tolerance selected from the group consisting of a pre-determined cost differential and a predetermined percent, wherein $C_{EST}$ is an estimate of a total cost of ownership of the N applications;

if $C_{REGR}$ differs from $C_{EST}$ by more than the tolerance then iterating until $C_{REGR}$ does not differ from $C_{EST}$ by more than the tolerance, wherein each iteration of the iterating comprises selectively re-executing the identifying, selecting, determining, calculating, ascertaining, and iterating steps;

choosing at least one control parameter from the parameters in the N regression functions such that the remaining parameters in the N regression functions are unselected;

specifying permissible values for each control parameter of the at least one control parameter, wherein the permissible values for each control parameter are independently selected from the group consisting of a discrete set of values, at least one continuous range of values, and a combination thereof;

expressing a total cost of ownership (T) of the N applications as a sum of the N regression functions associated with the N applications such that T is a function of the at least one control parameter, wherein the computed coefficients and a numerical value for each unselected parameter appears in T; and determining a value for each control parameter of the at least one control parameter so as to minimize T subject to the permissible values;

transmitting the value for each control parameter to an output device of the computer system;

maintaining each application of the N applications and utilizing and maintaining all instances of each application of the N applications at the minimized T with each control parameter of the at least one control parameter being at its determined value at which T is minimized.

2. The method of claim 1, wherein said determining the coefficients comprises solving simultaneous equations $\partial H/\partial K=0$, wherein K is a vector consisting of the unique coefficients in the regression functions of the J selected applications.

3. The method of claim 1, wherein P=2.

4. The method of claim 1, wherein Wj is equal to a constant weight W for J=1, 2, ..., J.

5. The method of claim 1, wherein J does not exceed a fraction of N, wherein the fraction is selected from the group consisting of 0.05, 0.10, 0.15, 0.20, 0.25., 0.30, 0.35, 0.40, 0.45, 0.50, 0.55, and 0.60.

6. A method for reducing a cost of ownership of a portfolio of N software applications, said method being performed via execution of computer implemented steps by a processor of a computer system, said method comprising performing the computer implemented steps, said computer implemented steps comprising:

identifying a regression function for each software application of the N software applications, wherein each regression function expresses an approximate cost of ownership of the application in terms of at least one parameter and at least one undetermined coefficient, wherein N is at least 2;

selecting J applications A1, A2, ..., Aj from the N applications such that a remaining N−J applications of the N applications are unselected, wherein J<N, wherein the coefficients in the regression functions for the N−J unselected applications constitute a subset of the coefficients in the regression functions for the J selected applications, and wherein Fj represents the approximate cost of ownership of the application Aj for j=1, 2, ..., J;

determining the coefficients in the regression functions for the J selected applications so as to minimize a function $H=\Sigma_j W_j |F_j - G_j|^P$, wherein $G_j$ is an actual cost of ownership of application $A_j$ for j=1, 2, ..., J, wherein $\Sigma_j$ represents a summation over j from j=1 to j=J, wherein P>0, and wherein $W_j$ are predetermined weights subject to $W_j > 0$, wherein said determining the coefficients comprises computing said coefficients, said computing comprising utilizing a numerical value of each parameter in each regression function relating to the J applications;

calculating a regression total cost of ownership $C_{REGR}$ of the N applications, said calculating comprising summing the N regression functions associated with the N applications including utilizing the computed coefficients and a numerical value of each parameter relating to the N applications;

ascertaining whether $C_{REGR}$ differs from $C_{EST}$ by more than a tolerance selected from the group consisting of a pre-determined cost differential and a predetermined percent, wherein $C_{EST}$ is an estimate of a total cost of ownership of the N applications;

if $C_{REGR}$ differs from CEST by more than the tolerance then iterating until $C_{REGR}$ does not differ from $C_{EST}$ by more than the tolerance, wherein each iteration of the iterating comprises selectively re-executing the identifying, selecting, determining, calculating, ascertaining, and iterating steps;

computing a first total cost of ownership ($T_1$) of the N applications as a first sum of the N regression functions associated with the N applications, using the computed coefficients and a first numerical value for each parameter in the N regression functions;

choosing at least one control parameter from the parameters in the N regression functions such that the remaining parameters in the N regression functions are unselected;

changing the numerical value for the at least one control parameter from the first numerical value to a second numerical value;

computing a second total cost of ownership ($T_2$) of the N applications as a second sum of the N regression functions associated with the N applications, using the computed coefficients, the first numerical value for each unselected parameter, and the second numerical value for each selected parameter;

determining that $T_2$ is less than $T_1$;

transmitting $T_2$ to an output device of the computer system;

maintaining each application of the N applications and utilizing and maintaining all instances of each application of the N applications at the second total cost of ownership ($T_2$) with each control parameter of the at least one control parameter being at its second numerical value.

7. The method of claim 6, wherein said determining the coefficients comprises solving simultaneous equations $\partial H/\partial K=0$, wherein K is a vector consisting of the unique coefficients in the regression functions of the J selected applications.

8. The method of claim 6, wherein P=2.

9. The method of claim 6, wherein $W_j$ is equal to a constant weight W for j=1, 2, ..., J.

10. The method of claim 6, wherein J does not exceed a fraction of N, wherein the fraction is selected from the group consisting of 0.05, 0.10, 0.15, 0.20, 0.25., 0.30, 0.35, 0.40, 0.45, 0.50, 0.55, and 0.60.

11. A method for reducing a cost of ownership of a portfolio of N software applications, said method being performed via execution of computer implemented steps by a processor of a computer system, said method comprising performing the computer implemented steps, said computer implemented steps comprising:

identifying a regression function for each software application of the N software applications, wherein each regression function expresses an approximate cost of ownership of the application in terms of at least one parameter and at least one undetermined coefficient, wherein N is at least 2;

selecting J applications A1, A2, ..., Aj from the N applications such that a remaining N−J applications of the N applications are unselected, wherein J<N, wherein the coefficients in the regression functions for the N−J unselected applications constitute a subset of the coefficients in the regression functions for the J selected applications, and wherein Fj represents the approximate cost of ownership of the application Aj for j=1, 2, . . . , J;

determining the coefficients in the regression functions for the J selected applications so as to minimize a function $H=\Sigma_j W_j |F_j - G_j|^P$, wherein $G_j$ is an actual cost of ownership of application $A_j$ for j=1, 2, . . . , J, wherein $\Sigma_j$ represents a summation over j from j=1 to j=J, wherein P>0, and wherein $W_j$ are predetermined weights subject to $W_j$>0, wherein said determining the coefficients comprises computing said coefficients, said computing comprising utilizing a numerical value of each parameter in each regression function relating to the J applications;

calculating a regression total cost of ownership $C_{REGR}$ of the N applications, said calculating comprising summing the N regression functions associated with the N applications including utilizing the computed coefficients and a numerical value of each parameter relating to the N applications;

maintaining each application of the N applications and utilizing and maintaining all instances of each application of the N applications at the second total cot of ownership ($T_2$) with each control parameter of the at least one control parameter being at its second numerical value.

12. The method of claim 11, wherein each second numerical value determined in the changing step is within specified permissible values for each control parameter, wherein the permissible values for each control parameter are independently selected from the group consisting of a discrete set of values, at least one continuous range of values, and a combination thereof, and wherein $T_2$ is minimized in the changing step with respect to the control parameters subject to the permissible values.

13. The method of claim 11, wherein said determining the coefficients comprises solving simultaneous equations $\partial H/\partial K=0$, wherein K is a vector consisting of the unique coefficients in the regression functions of the J selected applications.

14. The method of claim 11, wherein P=2.

15. The method of claim 11, wherein Wj is equal to a constant weight W for j=1, 2, . . . , J.

16. The method of claim 11, wherein J does not exceed a fraction of N, wherein the fraction is selected from the group consisting of 0.05, 0.10, 0.15, 0.20, 0.25, 0.30, 0.35, 0.40, 0.45, 0.50, 0.55, and 0.60.

* * * * *

UNITED STATES PATENT AND TRADEMARK OFFICE
CERTIFICATE OF CORRECTION

PATENT NO. : 7,529,714 B2  Page 1 of 1
APPLICATION NO. : 11/011681
DATED : May 5, 2009
INVENTOR(S) : Andreev et al.

It is certified that error appears in the above-identified patent and that said Letters Patent is hereby corrected as shown below:

Column 15, Line 19: Insert after Line 19:

-- ascertaining whether $C_{REGR}$ differs from $C_{EST}$ by more than a tolerance selected from the group consisting of a pre-determined cost differential and a predetermined percent, wherein $C_{EST}$ is an estimate of a total cost of ownership of the N applications;

if $C_{REGR}$ differs from $C_{EST}$ by more than the tolerance then iterating until $C_{REGR}$ does not differ from $C_{EST}$ by more than the tolerance, wherein each iteration of the iterating comprises selectively re-executing the identifying, selecting, determining, calculating, ascertaining, and iterating steps;

computing a first total cost of ownership ($T_1$) of the N applications as a first sum of the N regression functions associated with the N applications, using the computed coefficients and a first numerical value for each parameter in the N regression functions;

choosing at least one control parameter from the parameters in the N regression functions;

changing the numerical value for each control parameter from the first numerical value to a second numerical value such that a second total cost of ownership ($T_2$) of the N applications is less than $T_1$, wherein $T_2$ is a second sum of the N regression functions associated with the N applications using the computed coefficients, the first numerical value for each unselected parameter, and the second numerical value for each chosen parameter, wherein $T_2$ is minimized in the changing step with respect to the control parameters;

transmitting the second numerical value for each control to an output device of the computer system; --

Signed and Sealed this

Fifteenth Day of December, 2009

David J. Kappos
*Director of the United States Patent and Trademark Office*